(12) United States Patent
Heinken et al.

(10) Patent No.: US 10,907,518 B2
(45) Date of Patent: Feb. 2, 2021

(54) METHOD FOR REGENERATING A PARTICULATE FILTER IN THE EXHAUST SYSTEM OF A GASOLINE ENGINE

(71) Applicant: VOLKSWAGEN AKTIENGESELLSCHAFT, Wolfsburg (DE)

(72) Inventors: Sebastian Heinken, Braunschweig (DE); Tim Thaler, Hannover (DE); Pierre Misiek, Burgdorf (DE); Christian Steinbrecher, Wismar (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/521,075

(22) Filed: Jul. 24, 2019

(65) Prior Publication Data
US 2020/0032683 A1    Jan. 30, 2020

(30) Foreign Application Priority Data

Jul. 24, 2018   (DE) .................. 10 2018 117 843

(51) Int. Cl.
*F01N 3/023*    (2006.01)
*F02D 41/12*    (2006.01)

(52) U.S. Cl.
CPC .......... *F01N 3/023* (2013.01); *F02D 41/123* (2013.01); *F01N 2900/1606* (2013.01)

(58) Field of Classification Search
CPC ...... F01N 3/023; F01N 3/027; F01N 2240/16; F02D 41/123
See application file for complete search history.

(56) References Cited

U.S. PATENT DOCUMENTS

| 2012/0124995 A1 | 5/2012 | Springer et al. |
| 2016/0222898 A1 | 8/2016 | Ulrey et al. |

FOREIGN PATENT DOCUMENTS

| DE | 10 2010 044 102 A1 | 5/2012 |
| DE | 10 2012 022 153 A1 | 5/2014 |
| DE | 10 2013 220 881 A1 | 4/2015 |
| DE | 10 2015 108 224 A1 | 6/2016 |
| DE | 10 2015 015 794 A1 | 8/2016 |
| DE | 10 2016 101 105 A1 | 8/2016 |

OTHER PUBLICATIONS

Machine translation of DE 102012022153 A1, accessed Jun. 8, 2020. (Year: 2020).*
Machine translation of DE 102015015794 A1, accessed Jun. 8, 2020. (Year: 2020).*
Search report for German Patent Application No. 10 2018 117 843.3, dated Jul. 1, 2019.

* cited by examiner

*Primary Examiner* — Jonathan R Matthias
(74) *Attorney, Agent, or Firm* — Pearl Cohen Zedek Latzer Baratz LLP

(57) ABSTRACT

A method for regenerating a particulate filter in an exhaust system of an internal combustion engine, wherein it is thereby provided that the quantity of overrun air in the overrun operation of the combustion engine be adapted to the air required for oxidizing the soot trapped in the particulate filter to achieve a rapid and efficient regeneration of the particulate filter, and it is provided that a throttle valve be opened in overrun operation to an extent that allows a maximum permissible soot conversion without risking thermal damage to the particulate filter.

11 Claims, 2 Drawing Sheets

METHOD FOR REGENERATING A PARTICULATE FILTER IN THE EXHAUST SYSTEM OF A GASOLINE ENGINE

CROSS-REFERENCE TO RELATED APPLICATIONS

This application claims priority from German Patent Application No. 10 2018 117 843.3, filed Jul. 24, 2018, which is hereby incorporated by reference.

FIELD OF THE INVENTION

The present invention relates to a method for regenerating a particulate filter in the exhaust system of a gasoline engine according to the definition of the species in the independent claim. The present invention also relates to a motor vehicle having a gasoline engine and a particulate filter located in the exhaust system of the gasoline engine for implementing such a method.

BACKGROUND OF THE INVENTION

Future emissions legislation will place stringent demands on untreated engine emissions and on the exhaust gas aftertreatment of combustion engines. With the introduction of the next "EU6" stage emissions legislation, a limit value for the emitted particle count will also be mandated for gasoline engines. The use of a particulate filter will, therefore, be needed in some models to comply with this next emissions legislation. A gasoline particulate filter of this kind will be loaded with soot during vehicle operation. It will be necessary to continuously or periodically regenerate this gasoline particulate filter to prevent an excessive increase in the exhaust gas back pressure. Thermally oxidizing the soot trapped in the gasoline particulate filter using oxygen requires a high enough temperature level in conjunction with the simultaneous presence of oxygen in the exhaust system of the gasoline engine. In this regard, additional measures are needed since today's gasoline engines are normally operated without excess oxygen at a stoichiometric air/fuel ratio. Possible measures include, for example, increasing the temperature by adjusting the ignition timing, temporarily adjusting the gasoline engine toward lean, injecting secondary air into the exhaust system or a combination thereof. Until now, an ignition-timing retard has preferably been used in combination with a lean adjustment of the gasoline engine since such a method does not require additional components. Moreover, it is known to use the overrun phases of a gasoline engine where a fuel injection into the combustion chambers of the combustion engine is suppressed in order to provide the oxygen required to regenerate the particulate filter. To ensure a reliably functioning catalytic purification of the exhaust gas, and a most emission-free possible turning on and off of the engine combustion, a small quantity of air is needed in overrun operation. It is thereby achieved that the catalytic converter cools down to a lesser degree; on the other hand, the small quantity of overrun air makes it possible to improve resumption of the engine combustion after an overrun phase when an appropriately small fuel quantity can be metered into the combustion chambers. However, the small quantity of overrun air prevents any significant burning off of soot from the particulate filter, which is absolutely necessary for rapidly and efficiently regenerating the filter.

The German Patent Application DE 10 2010 044 102 A1 describes a method for regenerating a particulate filter in the exhaust system of a gasoline engine, secondary air being compressed by a compressor and introduced via a flutter valve into the exhaust system upstream of the particulate filter. The flutter valve can thereby be blocked, to prevent an undesired oxygen input into the exhaust system and an uncontrolled burning off of soot from the particulate filter.

The German Patent Application DE 10 2012 022 153 A1 describes a method for regenerating a particulate filter in the exhaust system of a gasoline engine, where a throttling device is opened in the induction tract in order to provide the oxygen required to regenerate the particulate filter. Alternatively, it is provided that the air/fuel ratio be adjusted toward lean in order to provide the oxygen required to regenerate the particulate filter.

The German Patent Application DE 10 2015 108 224 A1 discusses an exhaust gas aftertreatment system for a gasoline engine having a particulate filter, it being provided that the particulate filter be regenerated in overrun operation of the combustion engine. The exhaust-gas quantity returned via an exhaust-gas flap is regulated by the low-pressure exhaust gas recirculation to control the oxygen content in the exhaust gas in an overrun phase of the combustion engine.

However, the drawback of the known approaches is that the quantity of overrun air is limited in the known methods in order to avoid an uncontrolled burning off of soot from the particulate filter. The overrun air is thereby so heavily throttled that relatively long time periods for regenerating the particulate filter result. In addition, the small quantity of overrun air can cause the temperature of the particulate filter to drop below a regeneration temperature needed to oxidize the soot, so that regeneration ceases, and additional heating measures are needed to reheat the particulate filter to the regeneration temperature.

SUMMARY OF THE INVENTION

It is, therefore, an object of the present invention to shorten the heating phases during regeneration of a particulate filter, and to enhance the efficiency of the regeneration process.

This objective is achieved in accordance with the present invention by a method for regenerating a particulate filter in an exhaust system of a combustion engine, the particulate filter being regenerated in an overrun phase of the combustion engine. The method includes the following steps:
  determining a saturation condition of the particulate filter;
  heating the particulate filter to a regeneration temperature;
  computing a quantity of oxygen needed for regenerating the particulate filter;
  adapting the quantity of overrun air to the quantity of oxygen needed for regenerating the particulate filter.

As already described at the outset, it is fundamentally technically practical to keep the quantity of overrun air as small as possible in order to reduce the standard emissions of the combustion engine and prevent the exhaust-gas aftertreatment components from cooling to below the light-off temperature thereof. However, for an impending regeneration of the particulate filter, it is beneficial to raise this quantity of overrun air to allow a more rapid and effective burning off of soot from the particulate filter. The speed for burning off the soot from the particulate filter may be controlled by adapting the quantity of overrun air during regeneration of the particulate filter. Upon completion of regeneration of the particulate filter, the quantity of overrun air is reduced again to take advantage of a small quantity of overrun air from a technical standpoint. Thus, in comparison to related art methods, the particulate filter may be regenerated more rapidly in overrun operation. The result of shortening the regeneration time is that a shorter amount of time is needed to heat the particulate filter using internal engine or external heating measures, whereby the fuel requirement for the combustion engine drops. In addition, the nitrogen-oxide emissions of the combustion engine may be decreased since the exhaust system is operated for a shorter time period with excess air, where no reducing agents are present for nitrogen oxides.

Advantageous improvements to and refinements of the method indicated in the independent claim are rendered possible by the features delineated in the dependent claims.

A preferred specific embodiment of the method provides that the quantity of overrun air be increased by modifying the position of the throttle valve or by adapting the opening times of the valves of the combustion engine. The quantity of overrun air may be readily adapted accordingly by modifying the position of the throttle valve or by prolonging the opening times of the valves using induction tract or combustion engine components that are already present. Thus, there is no need for any additional components, making it possible for the method according to the present invention to be carried out in an essentially cost-neutral manner.

It is especially thereby preferred when the throttle valve is opened in overrun operation to an extent that allows a maximum soot conversion on the particulate filter. To increase the soot conversion in overrun operation of the combustion engine, the throttle valve is opened, thereby increasing the volume of air from the combustion chambers that enters into the exhaust system. More fresh air is thereby supplied to oxidize the soot trapped in the particulate filter, thereby accelerating the regeneration of the particulate filter. Moreover, the temperature of the particulate filter increases with the conversion rate of the soot, making it possible to eliminate internal engine heating measures or an external heating. Alternatively, the heating output may be reduced correspondingly.

A preferred specific embodiment of the method provides that the quantity of overrun air be increased by opening the throttle valve in response to the particulate filter reaching a lower threshold temperature. Besides an excess of oxygen in the exhaust system, a high enough temperature is needed to permit efficient regeneration of the particulate filter and oxidation of the soot trapped in the particulate filter. To prevent the quantity of overrun air from being increased without the soot trapped in the particulate filter being able to be oxidized, the method is only carried out upon reaching the appropriate temperature of the particulate filter.

It is thereby especially preferred that the lower threshold temperature be within the range of from 550° C.-600° C. The lower threshold temperature should be selected in a way that makes possible an effective and efficient oxidation of soot in the particulate filter, but that also prevents any thermal damage to the particulate filter. Since the minimum temperature needed to regenerate the particulate filter is approximately 550° C. to 600° C., this regeneration temperature is especially well suited as a lower threshold temperature.

A preferred specific embodiment of the method provides that the quantity of overrun air be reduced by the throttle valve closing in response to the particulate filter reaching an upper threshold temperature. Defining an upper threshold temperature makes it possible to prevent a large amount of fresh air from being introduced into the particulate filter when the particulate filter is already hot and an uncontrolled burning off of soot would pose the threat of thermal damage to the particulate filter. An upper threshold temperature is preferably within the range of from 800° C. to 900° C. By again reducing the quantity of overrun air within this range, it is possible to avoid further heating the particulate filter, thereby preventing thermal damage to the particulate filter or destruction thereof.

A preferred specific embodiment of the method provides that the particulate filter be regenerated in a plurality of incremental steps. Generally, one single overrun phase is not long enough to completely regenerate a particulate filter. It is, therefore, practical and desirable for the particulate filter to be regenerated in a plurality of incremental steps until the regeneration thereof is complete.

It is thereby preferred that heating phases be provided in each instance for the particulate filter between the incremental steps. To prevent cooling of the particulate filter between two regeneration phases, it may be necessary to implement a heating phase between two successive overrun phases. Generally, an overrun phase results in a cooling of the exhaust system and the exhaust gas aftertreatment components disposed therein. To maintain the regeneration temperature of the particulate filter and condition the particulate filter in a way that makes it possible for the soot particulates to be oxidized in a next overrun phase, energy may be introduced into the exhaust system through internal engine or external heating measures in order to keep the temperature of the particulate filter above the regeneration temperature.

It is thereby especially preferred that the combustion engine be operated between two overrun phases in a fired operation. A simple way to implement a heating phase between two overrun phases is to operate the combustion engine in a normal fired operation, preferably with a stoichiometric air/fuel ratio. It is thereby possible, when the overrun air is dethrottled, to prevent the temperature from increasing above a critical limiting temperature since the stoichiometric operation of the combustion engine removes oxygen from the exhaust gas, and the burning off of soot from the particulate filter ceases. The dethrottling may thereby take place on the basis of a calculation model stored in the control unit of the combustion engine, which is used to compute the temperature of the particulate filter. It is alternatively conceivable that the temperature of the particulate filter be measured highly dynamically, preferably at a plurality of measuring points of the particulate filter, and that the quantity of overrun air be regulated on the basis of the measured temperatures. Alternatively, a fired operating phase of the combustion engine may be used to reheat the particulate filter to the regeneration temperature thereof when, due to external conditions, it has dropped below that required to oxidize the soot trapped in the particulate filter.

A further enhancement of the method provides that the fired operating point include internal engine heating measures. Internal engine heating measures may be used to prevent cooling of the particulate filter, even at comparatively low loads of the combustion engine. In particular, the internal engine heating measures may be maintained until the particulate filter is completely regenerated.

It is especially thereby preferred that the internal engine heating measures include an ignition-timing retard of the ignition point of the spark plugs or a lambda split operation. A simple way to raise the exhaust gas temperature of the combustion engine is to retard the ignition point of the mixture in the combustion chambers of the combustion engine. This does, in fact, briefly degrade the thermal efficiency and result in excess fuel consumption, however, the amount of heat input into the exhaust system increases, thereby preventing cooling of the particulate filter. Alternatively, in a multicylinder engine, it is possible to operate some of the combustion chambers at a richer than stoichiometric air/fuel ratio and others at a leaner than stoichiometric air/fuel ratio, allowing unburned fuel components from the combustion chambers operated at richer than stoichiometric to react exothermally with the residual oxygen from those operated at leaner than stoichiometric, and thus for the exhaust gas temperature to be raised.

An alternative specific embodiment of the method provides that the particulate filter include an electrical heating element or that an electrical heating element be connected upstream of the particulate filter, the electrical heating element being activated during regeneration of the particulate filter to prevent cooling of the particulate filter below a regeneration temperature in overrun operation. The temperature of the particulate filter may likewise be raised to a regeneration temperature by electrical heating elements in the exhaust system, in particular an electrically heatable catalytic converter or an electrically heatable particulate filter.

The present invention provides a motor vehicle having a combustion engine that has an air supply system in which a throttle valve is disposed in an intake duct, as well as having an exhaust system, in which a particulate filter is disposed. The internal combustion engine communicates with an engine control unit which is adapted for implementing a method according to the present invention upon its execution of a machine-readable program code. A method according to the present invention for regenerating the particulate filter may be implemented in such a motor vehicle in an overrun phase of the combustion engine, to achieve an efficient and effective regeneration of the particulate filter. It is possible to decrease both the time needed to regenerate the particulate filter, as well as the time periods required for the heating thereof. In this manner, the fuel consumption may be reduced in comparison to related-art methods. The emissions of the combustion engine, in particular the nitrogen-oxide emissions, may be reduced in parallel.

Unless indicated otherwise in the individual case, the various specific embodiments of the present invention mentioned in this Application may be advantageously combined with one another.

BRIEF DESCRIPTION OF THE DRAWINGS

The present invention will be explained in the following in exemplary embodiments with reference to the accompanying drawings, in which.

DETAILED DESCRIPTION OF THE INVENTION

Figure 1:
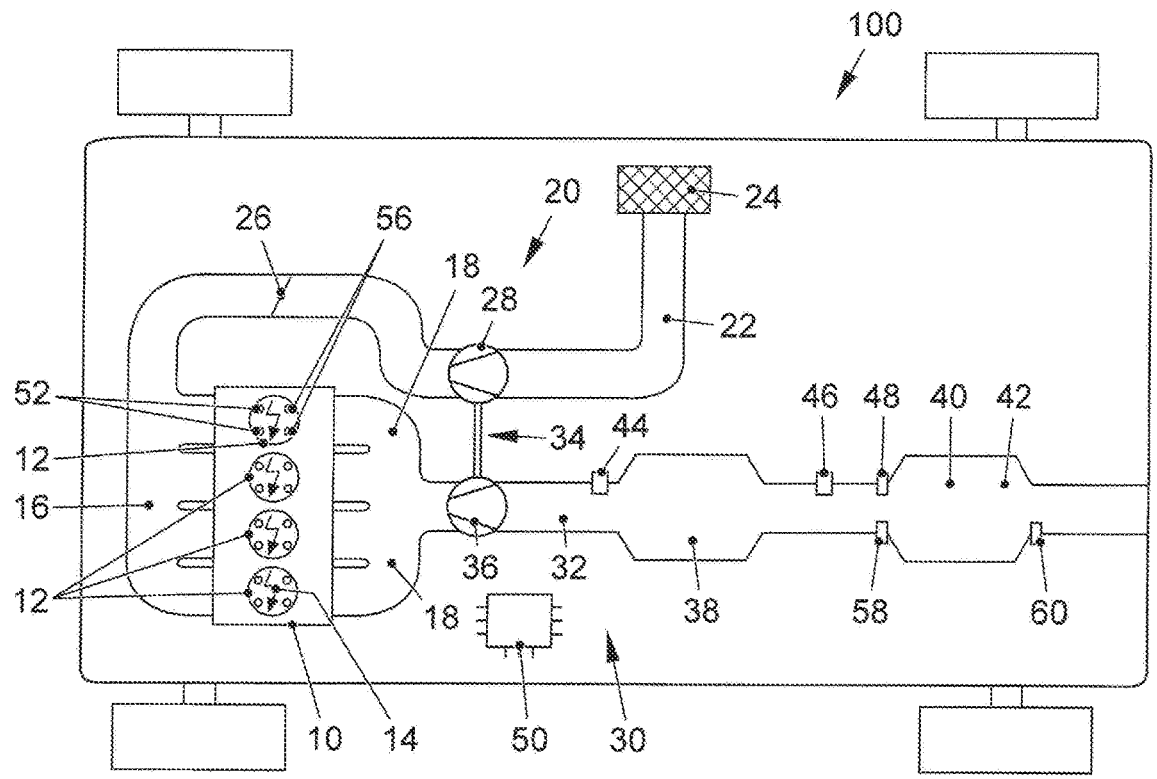
FIG. 1 shows a combustion engine having an air supply system and an exhaust system.

FIG. 1 is a schematic representation of a motor vehicle 100, which is driven by a combustion engine 10. Combustion engine 10 includes a plurality of combustion chambers 12, in which a fuel-air mixture is combusted. As shown in FIG. 1, combustion engine 10 is preferably designed as a combustion engine that is ignited by spark plugs 14, in accordance with the gasoline engine principle. To that end, at least one spark plug 14 is located in each of combustion chambers 12 in order to ignite the fuel-air mixture. In addition, combustion chambers 12 each have at least one intake valve 52 and an exhaust valve 56, which may be used for controlling the gas exchange of combustion chambers 12. Intake valves 52 and exhaust valves 56 may be actuated in a generally known manner via an appropriate mechanism by a camshaft of combustion engine 10 that is not shown in FIG. 1 for the sake of clarity. Combustion engine 10 communicates via an intake 16 with an air supply system 20. Air supply system 20 includes an intake duct 22, in which is configured an air filter 24 in the flow direction of the fresh air through intake duct 22, a compressor 28 of an exhaust-gas turbocharger 34 downstream of air filter 24, and a throttle valve 26 downstream of compressor 28. Alternatively, combustion engine 10 may also be designed as an induction engine, the need being eliminated in this case for exhaust-gas turbocharger 34 and, thus, for compressor 28 in intake duct 22. Moreover, combustion engine 10 may be supercharged by a mechanical or an electrical compressor.

Combustion engine 10 is coupled via exhaust 18 thereof to an exhaust system 30. In the flow direction of an exhaust gas of combustion engine 10 through the exhaust system, exhaust system 30 includes a turbine 36 of exhaust-gas turbocharger 34, which, via a shaft, drives compressor 28 in intake duct 22. Disposed downstream of turbine 36 is a three-way catalytic converter 38 and, further downstream, a particulate filter 40. Alternatively, by including a three-way catalytically active coating, particulate filter 40 may also be designed as what is generally referred to as a four-way catalytic converter 42. Disposed downstream of turbine 36 and upstream of three-way catalytic converter 38 in exhaust duct 32, is a first lambda probe 44, preferably a wide band lambda probe for measuring the air/fuel ratio in the exhaust gas. Provided downstream of three-way catalytic converter 38 and upstream of particulate filter 40 in exhaust duct 32 is a second lambda probe 46, which may be designed as a step change probe or as a wide band lambda probe. Also provided in the exhaust system, preferably on particulate filter 40, is a temperature sensor 48 which, prior to entry of the exhaust gas into particulate filter 40, makes it possible to measure an exhaust-gas temperature, on whose basis, a temperature of particulate filter 40 may be computed. Also provided upstream of particulate filter 40 is a first pressure sensor 58 and, downstream of particulate filter 40, a second pressure sensor 60, which make it possible to measure a differential pressure across particulate filter 40. Since the differential pressure across particulate filter 40 rises with increasing saturation of particulate filter 40, it is possible to estimate the saturation condition of particulate filter 40 on the basis of this pressure difference and determine when particulate filter 40 requires regeneration. Alternatively, the degree of saturation of particulate filter 40 may also be measured by using a saturation model, which, on the basis of the engine parameter of combustion engine 10, computes a soot input into particulate filter 40, respectively a soot output out of particulate filter 40, and thus the degree of saturation of particulate filter 40.

Combustion engine 10 communicates with an engine control unit 50. Engine control unit 50 controls the injection rates and the point of injection of the fuel into combustion chambers 12 of combustion engine 10, as well as the position of throttle valve 26 in intake duct 22. Engine control unit 50 also communicates via signal lines with lambda probes 44, 46, with temperature sensor 48, as well as with sensors 58, 60 for measuring differential pressure across particulate filter 40.

Figure 2:
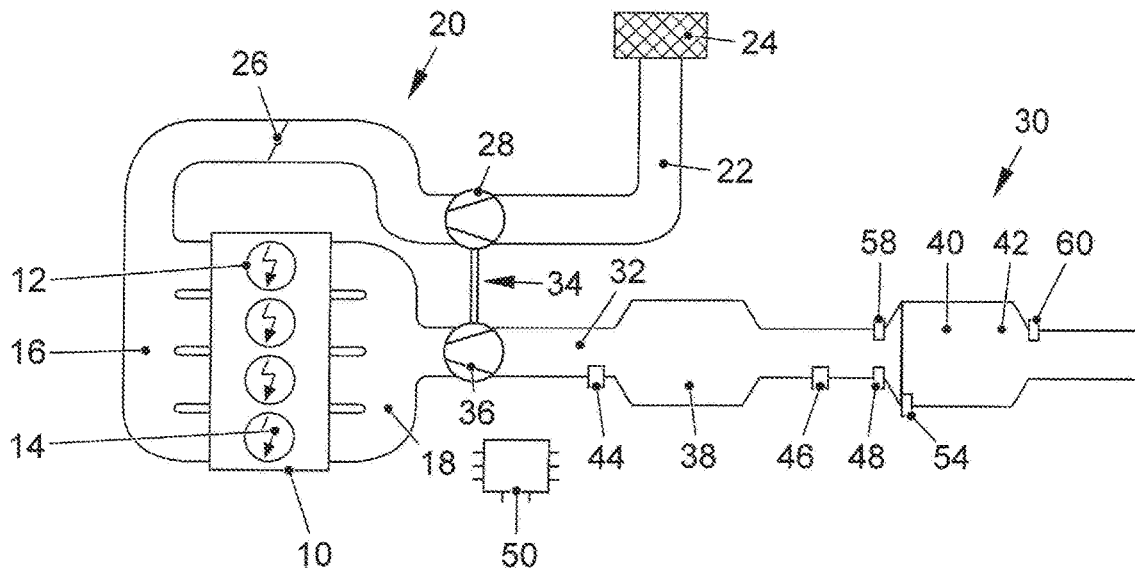
FIG. 2 shows another exemplary embodiment of an internal combustion engine having an air supply system and an exhaust system.

FIG. 2 shows another exemplary embodiment of a combustion engine 10 having an air supply system 20 and an exhaust system 30. In essentially the same design as in FIG. 1, provided here on particulate filter 40 is an electrical heating element 54, which is connected upstream of the honeycomb structure of particulate filter 40, and heats the exhaust gas prior to entry into particulate filter 40. As illustrated in FIG. 2, electrical heating element 54 is preferably designed as an electrical heating disk that is secured to the housing of particulate filter 40. Alternatively, however, other electrical heating elements 54 are also possible. In particular, the filter substrate of particulate filter 40 may also be designed to be electrically conductive and be heated by the application of an electric voltage.

Figure 3:
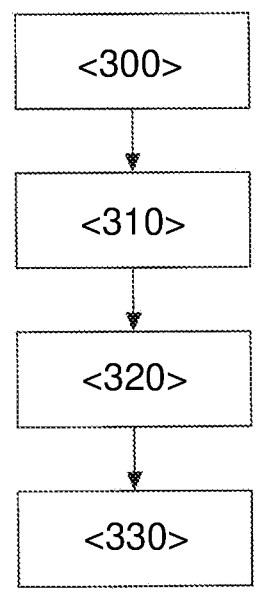
FIG. 3 shows a flow chart for implementing a method according to the present invention for regenerating a particulate filter in the exhaust system of the combustion engine.

FIG. 3 shows a flow chart for implementing an inventive method for regenerating particulate filter 40. In a first method step <300>, the saturation condition of particulate filter 40 is determined by a differential pressure measurement or on the basis of a balance calculation model stored in engine control unit 50. In a method step <310>, particulate filter 40 is heated to the regeneration temperature thereof by internal engine measures or by at least one electrical heating element 54 in exhaust system 30 of combustion engine 10. If particulate filter 40 has reached the regeneration temperature thereof, then method step <320> determines the quantity of oxygen needed to efficiently and reliably regenerate particulate filter 40. In a method step <330>, the overrun air is then adjusted in an overrun operation of combustion engine 10 in a way that makes it possible for the quantity of overrun air to be adapted to the quantity of oxygen needed for regenerating particulate filter 40. To that end, in particular, throttle valve 26 in intake duct 22 of combustion engine 10 is opened to increase the quantity of overrun air. Alternatively or additionally, the opening times of gas-exchange valves 52, 56 of combustion chambers 12 may be adapted in this overrun phase to dethrottle the air flow and increase the quantity of overrun air.

REFERENCE NUMERAL LIST 10 combustion engine
12 combustion chamber
14 spark plug
16 intake
18 exhaust
20 air supply system
22 intake duct
24 air filter
26 throttle valve
28 compressor
30 exhaust system
32 exhaust duct
34 exhaust-gas turbocharger
36 turbine
38 three-way catalytic converter
40 particulate filter
42 four-way catalytic converter
44 first lambda probe
46 second lambda probe
48 temperature sensor
50 control unit
52 intake valve
54 electrical heating element
56 exhaust valve
58 first pressure sensor
60 second pressure sensor
100 motor vehicle

The invention claimed is:

1. A method for regenerating a particulate filter in an exhaust system of a combustion engine, the particulate filter being regenerated in an overrun phase of the combustion engine, comprising the following steps:
determining a saturation condition of the particulate filter;
heating the particulate filter to a regeneration temperature;
computing a quantity of oxygen needed for regenerating the particulate filter; and
adapting the quantity of overrun air to the quantity of oxygen needed for regenerating the particulate filter;
increasing the quantity of overrun air by modifying the position of the throttle valve; and
opening the throttle valve in overrun operation to an extent that allows a maximum soot conversion on the particulate filter.

2. The method for regenerating a particulate filter as recited in claim 1, further comprising increasing the quantity of overrun air by opening the throttle valve when the particulate filter has reached a lower threshold temperature.

3. The method for regenerating a particulate filter as recited in claim 2, wherein the lower threshold temperature is within the range of 550° C. 600° C.

4. The method for regenerating a particulate filter as recited in claim 1, further comprising reducing the quantity of overrun air by closing the throttle valve in response to the particulate filter reaching an upper threshold temperature.

5. The method for regenerating a particulate filter as recited in claim 1, further comprising regenerating the particulate filter in a plurality of incremental steps.

6. The method for regenerating a particulate filter as recited in claim 5, wherein heating phases for the particulate filter are provided in each instance between the individual incremental steps.

7. The method for regenerating a particulate filter as recited in claim 5, further comprising operating the combustion engine between two overrun phases at a fired operating point.

8. The method as recited in claim 7, wherein the fired operating point includes internal engine heating measures.

9. The method as recited in claim 8, wherein the internal engine heating measures include an ignition-timing retard of the ignition point of the spark plugs or a lambda split operation.

10. The method as recited in claim 5, wherein the particulate filter includes an electrical heating element, or an electrical heating element is connected upstream of the particulate filter, the electrical heating element being activated during regeneration of the particulate filter to prevent cooling of the particulate filter below a regeneration temperature in overrun operation.

11. A motor vehicle comprising:
a combustion engine that comprises an air supply system in which a throttle valve is disposed in an intake duct,
an exhaust system, in which a particulate filter is disposed, and
an engine control unit that is adapted for implementing a method according to claim 1 upon execution of a machine-readable program code.

* * * * *